Jan. 1, 1957     K. T. DAVIS     2,776,117
FLOW CONTROL MEANS FOR AIR CONDITIONING APPARATUS
Filed Feb. 23, 1954
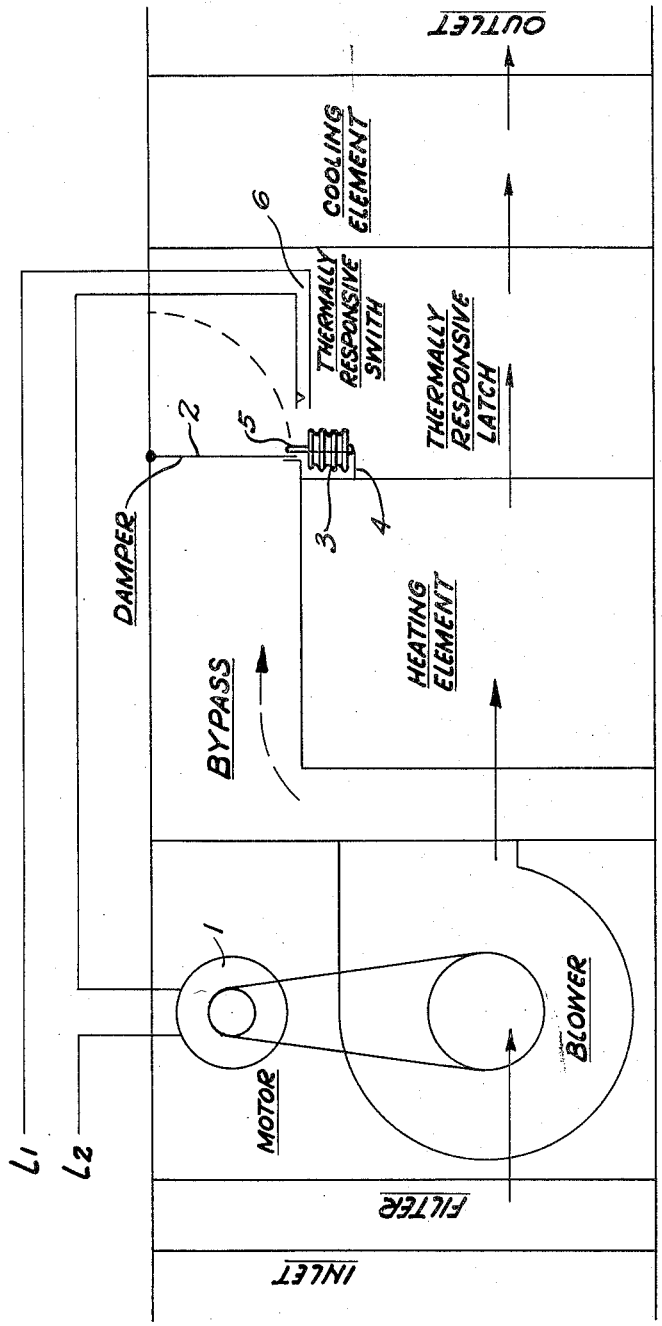
INVENTOR.
KEITH T. DAVIS
BY Frank R. Higley
ATTY.

2,776,117
Patented Jan. 1, 1957

2,776,117

FLOW CONTROL MEANS FOR AIR CONDITIONING APPARATUS

Keith T. Davis, Shaker Heights, Ohio, assignor to Carrier Corporation, a corporation of Delaware Application February 23, 1954, Serial No. 411,730

1 Claim. (Cl. 257—3)

This invention relates to year around air conditioning apparatus of the type including a heating element for winter service, a cooling element for summer service, and a single blower element, the three elements being arranged in series relation for sequential flow of air therethrough, such arrangement being known in the art, it being understood that the two possible heat exchanging operations are selective as under the usual thermostatic controls responsive to the space served with conditioned air by the apparatus.

In such an installation a problem faced by employment of a single blower arises from the fact that a desirable flow rate is usually considerably less in winter heating than in summer cooling.

A principal object of this invention is to provide that such rate differential may be had in such apparatus from the single blower thereof.

Very briefly, this is attained by provision of a bypass for a portion of the air flow, around the heating element.

Further, the invention provides control of such bypass so that in winter operation all of the air flows through the heating element as well as the cooling element, whereas in summer operation at least a substantial portion of the air flows through the bypass as well as a portion through the heating element; and consequently there is less resistance to total flow and a higher air delivery rate is had for cooling than for heating.

More particularly the invention includes, as further objects, automatic control of the bypass for such ends, and responsive to operation of the heating element.

As is usual in the art, immediate control of the blower in winter is such that commencement of blower operation does not take place until after the heating element has attained operating temperature—so that on demand for heat, only warm air will be delivered.

Another object of the invention is to insure that, for winter operation, the damper of the bypass will be secured in closed position before commencement of operation of the blower; although in summer operation the damper will be free to open upon operation of the blower.

Further objects and advantages will be apparent from the following description, taken in connection with the accompanying drawing, which is a diagrammatic and conventionalized view, as in sectional elevation, disclosing an embodiment of the invention.

With reference now to the drawing, and as partially indicated thereon by legend, a blower, a heating element and a cooling element are arranged in series relation and suitably enclosed by housing means so that upon operation of the blower, flow through the apparatus will be from its inlet to its outlet, sequentially through the heating element and cooling element, as indicated by the solid arrows.

As is usual in the art, a filter may be located ahead of the blower, the blower driven by a motor 1 as through the belt indicated, and the blower, heating element, and cooling element somewhat spaced apart in the direction of flow. Also, the heating element may be served by a furnace, boiler, or the like, and the cooling element by refrigeration means of any suitable type—all under suitable controls subject to thermostatic demand, as well known in the art and not here illustrated.

According to this invention, the housing means employed is arranged to provide a bypass around the heating element, as indicated in the drawing, and a damper 2 located to control flow through the bypass. As here disclosed, the damper 2 is located at the outlet of the bypass and hinged at its upper edge to normally rest in closed position to which it is yieldably urged by gravity, but to be opened by swinging downstream therefrom responsive to air pressure from operation of the blower.

Means are provided, however, for securing or latching the damper in its closed position, responsive to operation of the heating element. As here conventionally illustrated, such means comprises a thermally responsive element 3, of any suitable type but here indicated as a bellows type, mounted adjacent the outlet of the heating element, as by bracket 4, and having a post 5 which, when the heating element is in operation, will be raised by the element 3 to the position illustrated, blocking the damper 2 against opening; and when the heating element is cold, as in summer operation, the post 5 will be lowered by the element, to free the damper for opening during operation of the blower.

As usual in the art, a thermally responsive switch 6 is included in the blower control, located with relation to the heating element to provide that upon call for heat, operation of the blower does not commence until the heating element has come up to substantially full operating temperature in established operating condition.

According to this invention, the relation between this thermally responsive switch 6, and the thermally responsive damper latch means above described, is such that, at commencement of operation of the heating element, the post 5 will be moved by its element 3 to block the damper 2, before the switch 6 closes to effect energization of the blower motor 1.

Thus, overall operation of the air conditioning apparatus will be as follows:

In winter, and upon call for heat, the damper 2 will effectively be secured in closed position whenever the blower is in operation, so that air flow will be from the inlet to the outlet of the apparatus as indicated by the solid arrows, through both the heating element and the cooling element, with none through the bypass and past the damper 2.

In summer operation, since the heating element remains cold, the latch 5 remains clear of the damper 2 and the latter may freely be swung to open position by air forced by the blower through the bypass. All of the air passes through the cooling element, and some may pass through the heating element as well, but a substantial portion of the air is relatively free to bypass the heating element by way of the opened damper 2. The proportion of total air in parallel flow through the bypass and heating element respectively, is determined by the relative resistance between heating element and bypass, and in practice, as will be understood, the bypass may be sized to accommodate a major portion of such air.

It will be apparent that whereas in winter operation all of the air must pass through both the heating element and the cooling element, with their combined resistance to flow, in summer operation a large portion of the air need not pass through the heating element and therefore total flow is subject to less resistance.

Thus, a higher air delivery rate is automatically had from the same blower, in summer cooling operation than in winter heating operation.

Although the arrangement indicated in the drawing provides horizontal flow through the apparatus, the invention would be equally applicable were the arrangement one for vertical flow, whether upward or downward.

Upward flow would merely essentially require disposition of the parts at 90° counterclockwise from their illustrated disposition, such that the damper would still be yieldably urged by gravity to closed position. For downward flow and the principal parts thus oriented 90° clockwise from their disposition indicated in the drawing, would merely require counterweight or light spring applied to the damper to yieldably urge it into closed position, as would be well within the skill of anyone of competence in the art.

I claim:

Summer and winter air conditioning apparatus of the class described including a blower for causing flow of air to be conditioned, a cooling element for summer operation, housing means for confining said flow to provide a stream all of which flows through said cooling element, a heating element for winter operation arranged in said housing means to be in a portion of said stream, said housing means being arranged to provide a bypass around said heating element for another portion of said stream, damper means for said bypass, mounted in said housing to yieldably assume closed position when said blower is idle, and to normally be opened therefrom by operation of said blower, latch means arranged to automatically secure said damper against opening, responsive to initial operation of said heating element, and means for causing winter operation of said blower to follow continued operation of said heating element after said securement of said damper by said latch means.

References Cited in the file of this patent

UNITED STATES PATENTS

| | | |
|---|---|---|
| 1,895,444 | Cassell | Jan. 31, 1933 |
| 2,172,667 | Nelson | Sept. 12, 1939 |
| 2,217,680 | Haines | Oct. 15, 1940 |
| 2,266,029 | Haines | Dec. 16, 1941 |